Dec. 23, 1924.

J. M. MURPHY 1,520,545

TRANSMISSION GEARING

Filed Sept. 4, 1924     2 Sheets-Sheet 1

Inventor,
John M. Murphy.
By Robert Watson
Attorney

Dec. 23, 1924.

J. M. MURPHY

TRANSMISSION GEARING

Filed Sept. 4, 1924

Inventor,
John M. Murphy.
By Robert Watson
Attorney

Patented Dec. 23, 1924.

1,520,545

UNITED STATES PATENT OFFICE.

JOHN M. MURPHY, OF SHAMOKIN, PENNSYLVANIA, ASSIGNOR OF ONE-HALF TO CHARLES K. MORGANROTH, OF SHAMOKIN, PENNSYLVANIA.

TRANSMISSION GEARING.

Application filed September 4, 1924. Serial No. 735,906.

*To all whom it may concern:*

Be it known that I, JOHN M. MURPHY, a citizen of the United States, residing at Shamokin, in the county of Northumberland and State of Pennsylvania, have invented certain new and useful Improvements in Transmission Gearing, of which the following is a specification.

This invention relates to transmission gearing of the so-called sliding gear type, and has for one of its objects to provide a transmission gearing of this character which will be simple in construction, comparatively inexpensive to manufacture and more efficient in use than those which have been heretofore proposed.

A further object of the invention is to provide a sliding gear transmission in which the meshing of the slidable gear with the relatively stationary gears, will be facilitated, to the end that the various changes of speed may be accomplished without the clashing of the gears and the stripping of the gear teeth.

A still further object of the invention is to provide a transmission of the character described in which there is employed one or more cone gears which are engaged by a slidable gear which may range through the length of the cone, to secure the various speed changes, the said cone gears being provided with specially formed guiding teeth which facilitate the meshing of the teeth of the sliding gear to the end that the stripping of the teeth will be prevented.

With the above and other objects in view, which will appear as the description proceeds, the invention consists in the novel details of construction, combinations and arrangements of parts, more fully hereinafter described and particularly pointed out in the appended claims.

Referring to the accompanying drawings forming a part of this specification, in which like numerals designate like parts in all the views.

Figure 1:
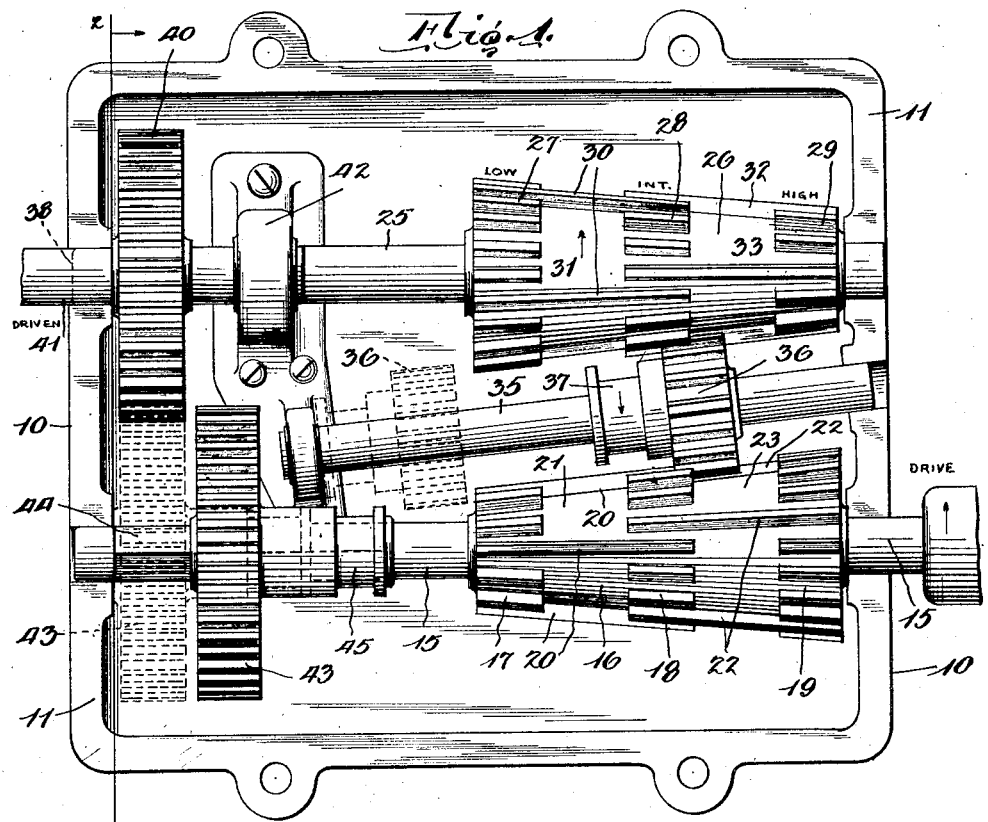
Figure 1 is a top plan view of one form of transmission gearing constructed in accordance with the present invention, the upper portion of the housing being removed for the sake of clearness.
Figure 2:
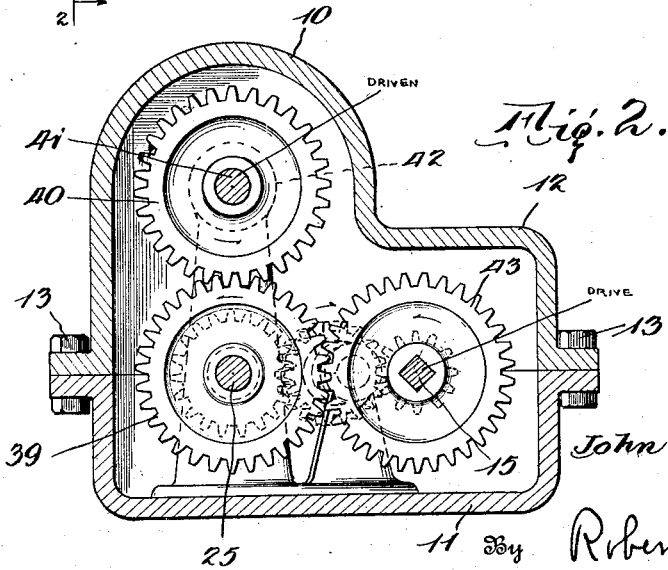
Fig. 2 is a transverse vertical sectional view of the parts shown in Fig. 1, taken approximately on the plane indicated by the line 2—2 of Fig. 1, looking in the direction of the arrows.

Referring more particularly to Figs. 1 and 2, the numeral 10 indicates a casing or housing which may be composed of the upper and lower sections 11 and 12, cast, stamped, or otherwise suitably formed and normally secured together by means of suitable bolts 13. Suitably journalled in the said casing 10, preferably to one side thereof, is a drive shaft 15, which extends from end to end of said casing or housing and projects beyond one end, as indicated at the right of Fig. 1, to be secured in any suitable manner to the source of power, not shown.

The said shaft 15 is provided adjacent its right hand end with the cone gear member 16, which is formed with three or more independent sets of gear teeth 17, 18 and 19. The numbers of teeth in the various gears 17, 18, and 19 are so chosen as to have a common divisor, here shown as 4, so that the gear 17 will have 12 teeth, the gear 18 will have 16 teeth and the gear 19 will have 20 teeth.

It thus results that every 3rd tooth of the gear 17 will be in longitudinal alignment with every 4th tooth of the gear 18, and such teeth are preferably made continuous, as indicated at 20 in Fig. 1, thereby bridging the space 21 between the remaining teeth of the gears 17 and 18, as will be readily understood from Fig. 1. In like manner, every 4th tooth of the gear 18 will be in longitudinal alignment with every 5th tooth of the gear 19 and these teeth are likewise made continuous, as indicated at 22, bridging the space 23 between the remaining teeth of the gears 18 and 19.

Journalled within the casing 10, in parallel spaced relation to the shaft 15, is a counter-shaft 25, which rigidly carries adjacent its right hand end, as viewed in Fig. 1, a cone gear member 26, which may be similar in every respect to the cone gear member 16, except that it is mounted in a reverse direction, as will be readily understood. That is to say the large end of the cone gear member 26 will be arranged opposite to the small end of the cone gear member 16 and vice versa, so that the 20 toothed gear 27 of the member 26 will be in transverse alignment with the 12 toothed gear 17 of the member 16, the 16 toothed gear 28 will be opposite the 16 toothed gear 18 and the 12 toothed gear 29 will be opposite the 20 toothed gear 19. As was the case with the cone gear member 16, longitudinally aligning teeth, such as 30 of the gears 27 and 28, are made continuous across the intermediate space 31 between the said gears and similar teeth 32 of the gears 28 and 29 are made continuous across the space 33 between such gears.

Also journalled in the casing or housing 10 is an intermediate shaft 35 on which is slidably mounted the intermediate gear or pinion 36. As will be clear from Fig. 1, the shaft 35 is inclined relative to the shafts 15 and 25 so that its axis is substantially parallel to the inclined parallel surfaces of the cone gear members, 16 and 26, as will be readily understood from Fig. 1.

It thus results that the gear 36 may be moved longitudinally of its shaft 35 to bridge the gap between the various pairs of gears 17, and 27, 18, and 28, 19, and 29, whereby power may be transmitted from the shaft 15 to the shaft 25, as will be readily understood.

Of course, the rate of speed at which the shaft 25 will be driven will depend upon the position of the sliding intermediate gearing pinion 36, since obviously, if it is meshing with the gears 19 and 29, the shaft 25 will be driven at a higher rate of speed than if the said gear 36 is meshing with the gears 18 and 28 or the gears 17 and 27, due to the different diameters of the respective gears.

The gear or pinion 36 is preferably provided with a grooved collar portion 37, which may be engaged by the end of any suitable operating lever, not shown, and whereby the said gear may be shifted longitudinally of the said shaft to secure the various speed changes.

The shaft 25, which, as was above stated, was a counter-shaft, terminates at its left hand end substantially flush with the outside of the casing 10, as indicated at 38, and the said shaft carries adjacent its end, a spur gear 39, which constantly meshes with a companion gear 40 carried by the driven shaft 41, which projects into the casing or housing 10 and has its inner end suitably journalled in a bearing block 42. The power from the drive shaft 15 will thus be transmitted through the cone gear member 16 to the intermediate gear 36, thence to the cone gear member 26 and shaft 25 from whence it will be in turn transmitted through the gear 39 to the gear 40 to the driven shaft 41, as will be readily understood.

In order to secure a reversal of the direction in which the shaft 41 is driven, a reversing gear 43 is slidably mounted upon a squared portion 44 of the shaft 15, the said gear being preferably provided with a grooved collar 45, which may be engaged by the end of the gear operating lever, not shown, whereby the said gear may be slid longitudinally of the shaft 15 to move it into and out of engagement with the gear 39, as indicated in dotted lines and full lines in Fig. 1. Of course, it will be understood that when the gear 43 is in its dotted line position to secure the reverse direction, the gear 36 will also be in its dotted line position, so that power will be transmitted from the shaft 15 to the shaft 41 through the medium of the gears 43, 39 and 40, while the gear 36 remains idle. To this end the gear operating lever, not shown, may be arranged to actuate both the gears 36 and 43, so that it will be impossible to mesh the gear 43 with the gear 39, until the gear 36 has been moved to its dotted line position shown in Fig. 1.

Figure 3:
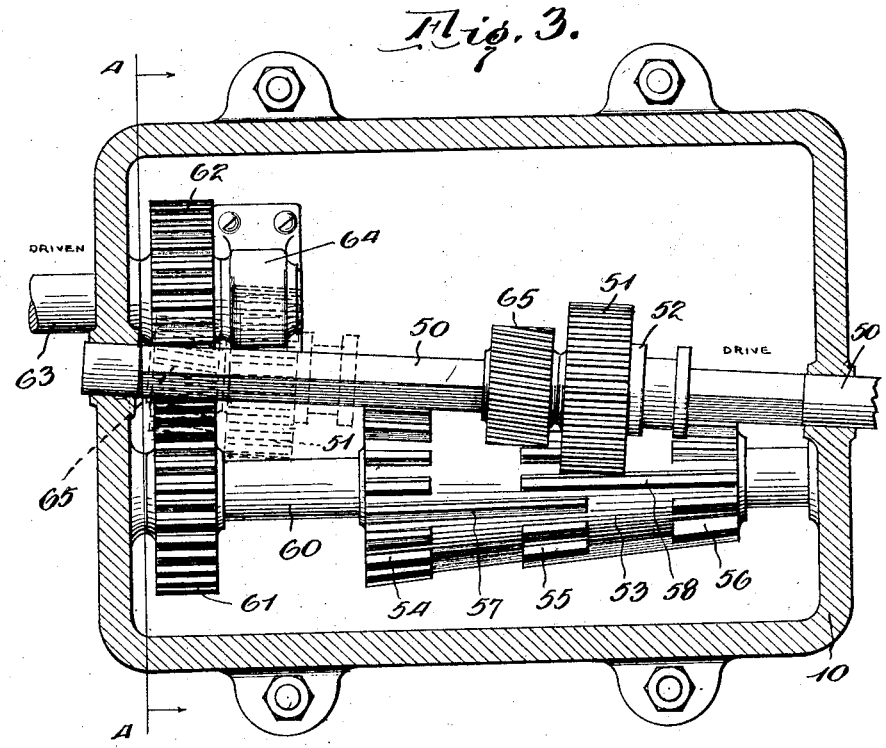
Fig. 3 is a sectional plan view of a somewhat modified form of transmission gearing, employing only a single cone; and, Fig. 4 is a transverse vertical sectional view taken approximately on the plane indicated by the line 4—4 of Fig. 3, looking in the direction of the arrows.
Figure 4:
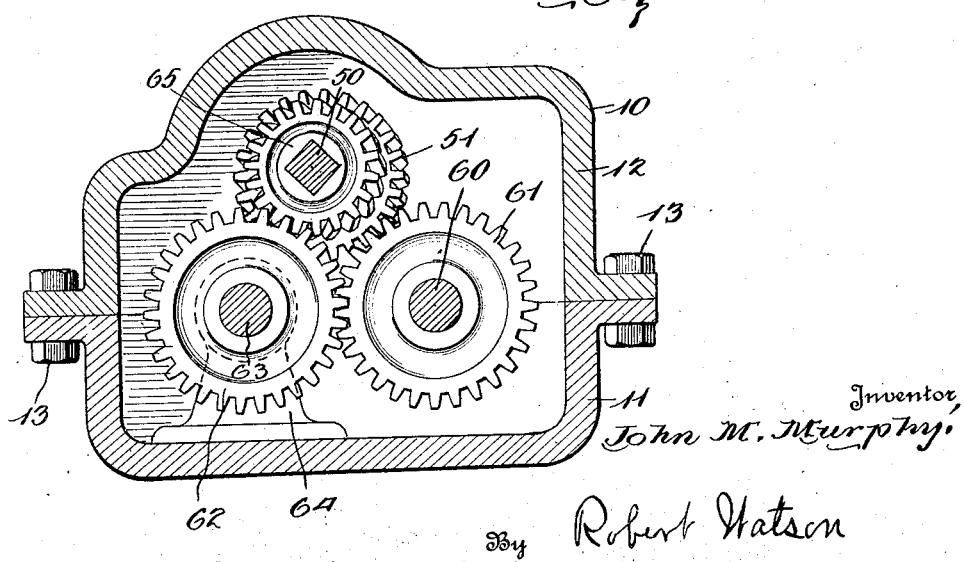

Coming now to the modified form of the invention shown in Figs. 3 and 4, the driving cone, such as 16, previously described, may be eliminated and the power applied direct to a shaft similar to the shaft 35, which carries the intermediate gear 36. For example, the shaft 50, corresponding to the shaft 35 previously described, is journalled in the casing or housing 10 and is preferably squared, as shown in Fig. 3, upon which squared portion is mounted a driving gear 51, provided with the grooved collar 52 by means of which the said gear may be shifted longitudinally of the shaft.

The said gear 51 is arranged to mesh with the cone gear member 53 which is provided with the sets of gear teeth 54, 55 and 56, similar to the gears 27, 28 and 29, etc., previously described and having the common continuous teeth 57 and 58, as shown in Fig. 3. The said cone gear member 53 is carried by the countershaft 60 suitably journalled in the casing or housing 10 and the shaft is provided adjacent its left hand end, as viewed in Fig. 3, with the spur gear 61, which meshes with the companion spur gear 62 carried by the driven shaft 63, which projects into the housing 10, and has its inner end suitably journalled in bearing blocks 64.

In this form of the invention power will be transmitted from the shaft 50 through the gear 51 to the cone gears 54, 55 and 56, depending upon the longitudinal position of the said gear 51, and thence to the shaft 60, from whence it will be transmitted by the gears 61 and 62 to the driven shaft 63, as will be readily understood.

In order to provide for reversing in this type of transmission, there is provided a special gear 65 also slidably mounted upon the squared portion of the shaft 50 and preferably rigidly connected to the gear 51 so that the two may be moved axially in unison. The said gear 65 is of necessity somewhat smaller in diameter than the gear 51, so that it may clear the teeth of the gears 54 or 55 without engaging the same, and its teeth are cut at a slight angle, which is dependent upon the angle of inclination of the shaft 50, so that when the said gear 65 is moved to the extreme left, as viewed in Fig. 3, its said teeth may mesh with the teeth of the spur gear 62, whereby power may be transmitted directly through the shaft 50 to the shaft 63.

As was above stated, provision of the continuous teeth such as 20, 22, 30, 32, 57 and 58, upon the cone gear members 16, 26 and 53, constitutes an important feature of this invention, since by so providing these teeth the companion sliding gears such as 36 and 51 may be readily moved from one position to the other, one or more of their teeth being always constantly engaged by one of the said continuous teeth, such as 20, 22, etc., whereby the meshing of the said gears is greatly facilitated. This meshing may, of course, be further facilitated by bevelling the extreme ends of the short teeth of the gears, such as 17, 18, 19, etc., and the ends of the teeth of the gears 36 and 51 in the well known manner, although with the use of the continuous teeth, such as 20 and 22 etc. such bevelling is not absolutely necessary.

It is obvious that those skilled in the art may vary the details of construction as well as the arrangement of parts without departing from the spirit of the invention, and therefore it is not wished to be limited to the above disclosure, except as may be required by the accompanying claims.

What is claimed is:

1. In a change speed transmission gearing, a drive shaft; a driven shaft; and means for transmitting motion from one to the other whereby the driven shaft may be rotated at varying rates of speed, said means including a cone member having a plurality of concentric longitudinally spaced sets of teeth, some of said teeth being continuous to include at least two of said sets, and a slidable gear adapted to be moved longitudinally of said cone to engage any desired set of teeth, said slidable gear being guided into mesh with said cone teeth by said continuous teeth.

2. In a change speed transmission gearing, a cone gear member provided with a plurality of spaced concentric sets of teeth constituting separate gears, some of the teeth of adjacent gears being in longitudinal alignment and continuous across said spaces; and a slidable gear arranged to be moved longitudinally of said cone to engage the various sets of teeth thereon, said slidable gear being guided into mesh therewith by said continuous teeth.

3. In a change speed transmission gearing, a cone gear member provided with a plurality of concentric longitudinally spaced sets of teeth constituting separate gears, the numbers of the teeth in said gears constituting multiples of a common factor, whereby certain teeth of adjacent gears may be in longitudinal alignment, such aligned teeth being continuous across said spaces; and a slidable gear arranged to be moved longitudinally of said cone to engage the various sets of teeth thereon, said slidable gear being guided into mesh therewith by said continuous teeth.

4. In a transmission gearing of the class described, a drive shaft, a driven shaft, and a counter-shaft; a pair of oppositely disposed cone gear members carried respectively by said drive and counter-shafts, each being provided with a plurality of sets of longitudinally spaced teeth constituting separate gears, some of the teeth of adjacent sets being in longitudinal alignment and continuous across the intermediate spaces; an intermediate shaft mounted between said cones with its axis substantially parallel to the adjacent surfaces thereof; and a gear slidably mounted on said intermediate shaft, adapted to be moved into engagement with any of the companion gears of said cones, said slidable gear being guided into such engagement by said continuous teeth.

5. In a transmission gearing of the class described, a drive shaft, a driven shaft, and a countershaft; a pair of oppositely disposed cone gear members carried respectively by said drive and countershafts, each being provided with a plurality of sets of longitudinally spaced teeth constituting separate gears, the numbers of teeth in said gears constituting multiples of a common factor, whereby certain teeth of longitudinally adjacent gears may be in longitudinal alignment, such aligned teeth being continuous across the intermediate spaces; an intermediate shaft mounted between said cones with its axis substantially parallel to the adjacent surfaces thereof; a gear slidably mounted on said intermediate shaft, adapted to be moved thereon into engagement with any of the companion gears of said cones, or out of engagement with all of them, said slidable gear being guided into such engagement by said continuous teeth; gear connections between said counter and driven shafts; and a gear on said drive shaft adapted to engage the gear on said driven shaft when the slidable gear on the intermediate shaft is out of engagement, to reverse the motion of said driven shaft.

6. A gear element for sliding change speed transmisions comprising a cone provided with a plurality of sets of longitudinally spaced teeth constituting separate concentric gears, some of the teeth of adjacent gears being in longitudinal alignment and continuous across the spaces between said gears.

In testimony whereof I hereunto affix my signature.

JOHN M. MURPHY.